United States Patent [19]

Brandt et al.

[11] Patent Number: 5,204,930
[45] Date of Patent: Apr. 20, 1993

[54] OPTICAL FIBERS, AND A PROCESS FOR THEIR PRODUCTION

[75] Inventors: Heinz-Dieter Brandt; Wolfgang Ebert; Udo Wolf; Wilfried Cramer, all of Krefeld, Fed. Rep. of Germany

[73] Assignee: Bayer Aktiengesellschaft, Leverkusen, Fed. Rep. of Germany

[21] Appl. No.: 821,106

[22] Filed: Jan. 15, 1992

[30] Foreign Application Priority Data

Jan. 26, 1991 [DE] Fed. Rep. of Germany ....... 4102340

[51] Int. Cl.[5] ................................................ G02B 6/16
[52] U.S. Cl. ...................................... 385/143; 385/145
[58] Field of Search ............... 385/143, 141, 142, 144, 385/145; 522/31; 528/31, 33, 93

[56] References Cited

U.S. PATENT DOCUMENTS

| | | | |
|---|---|---|---|
| 4,069,055 | 1/1978 | Crivello | 528/93 |
| 4,279,717 | 7/1981 | Eckberg et al. | 528/33 X |
| 4,576,999 | 3/1986 | Eckberg | 528/81 X |
| 4,576,999 | 3/1986 | Eckberg | 528/31 X |
| 4,788,268 | 11/1988 | Lau et al. | 528/27 |
| 4,968,116 | 11/1990 | Hulme-Lowe et al. | 385/145 |

Primary Examiner—Akm E. Ullah
Assistant Examiner—Phan Thi Heartney
Attorney, Agent, or Firm—Sprung Horn Kramer & Woods

[57] ABSTRACT

Optical fibres, and a process for their production, are described which comprise tubular plastic cladding and a core of a polymer whose refractive index is at least 1% greater than that of the cladding material. The core is obtained from a polymerisable mixture which comprises compounds containing epoxy groups, of which at least 10% by weight are siloxanes containing epoxy groups.

15 Claims, 1 Drawing Sheet

OPTICAL FIBERS, AND A PROCESS FOR THEIR PRODUCTION

BACKGROUND OF THE INVENTION

1. Field of the Invention

The present invention relates to optical fibres of improved heat resistance, and to a process for their production. The optical fibres according to the invention are obtained from a polymerisable mixture which comprises compounds containing epoxy groups, of which at least 10% by weight are siloxanes containing epoxy groups.

Optical fibres are media for information transfer.

2. Description of the Related Art

Optical fibres based on silicate glass have been known for some time. These optical fibres have very low attenuation and thus high reserves for reliable information transfer and have a high long-term service temperature. However, silicate glass fibres of this type have the disadvantage of inadequate flexibility, high costs for the production of a high-purity glass which is necessary, and complex preparation of the end faces and coupling of the end faces.

For these reasons, optical fibres based on organic polymers have recently been developed which have excellent flexibility, low weight, relatively low production costs and simpler coupling methods.

Thus, optical fibres are described (DE-OS (German Published Specification) 24 55 265; JP-B 78/42 261) which are produced from highly transparent and amorphous polymers, such as polymethyl methacrylate (PMMA), polystyrene (PS) or polycarbonate (PC). The optical fibres are produced by melting the polymer and shaping the melt, for example by extrusion. Such fibres can furthermore be provided with an outer skin, for example by coextrusion or by coating.

For production by melt forming, the polymers employed must have excellent melt-forming properties. For this reason, polymers which are unstable at the high temperatures necessary for melt forming or have high molecular weights and thus high melt viscosities or have a crosslinked structure are unsuitable as core materials.

In the melt forming process, the polymers are furthermore subjected to high temperatures and high shear forces. This can result in impairment or modification of the quality, for example due to polymer degradation, so that some of the transparency is lost. Furthermore, the risk of contamination, for example from external sources, cannot be sufficiently excluded during the melt forming process.

Optical fibres based on PMMA and PS can be produced with low attenuation. However, their heat resistance is inadequate for many applications, in particular in the machine and automotive sectors. Although optical fibres containing PC as the core material have higher heat resistance, their attenuation is relatively high due to chemical structural contributions. Polymeric plastics which have sufficiently high transparency (=low attenuation) and sufficiently high heat resistance are now being sought for the production of optical fibres for said applications. For the reasons given, thermoplastic polymers cannot fill this gap due to their low glass transition temperature.

However, optical fibres and processes for their production in which ethylenically unsaturated compounds which can be polymerised by means of free radicals are used have also been described (German Patent Specification 36 25 180). Optical fibres of this type have the advantage over those described above that they are built up from low-molecular-weight substances. These starting compounds can be produced in extremely high optical purity, for example by distillation. In general, not only monofunctional, but also difunctional or polyfunctional, ethylenically unsaturated compounds which can be polymerised by means of free radicals are employed.

Such mixtures, which contain a certain amount of a crosslinking agent, are distinguished, after the crosslinking polymerisation, by increased heat resistance. The fibres are produced by introducing the monomer mixture which can be polymerised by free radicals into the cladding material with addition of a polymerisation inhibitor and subsequently subjecting the mixture to suitable polymerisation conditions. The polymer or copolymer forming the core is thus formed in this plastic cladding.

SUMMARY OF THE INVENTION

Novel optical fibres have been found which are produced on the basis of siloxanes containing epoxy groups and combine, in an excellent manner, the properties of high transparency and high heat resistance.

The invention relates to an optical fibre having a tubular plastic cladding and a core of a polymer whose refractive index is at least 1% greater than that of the cladding material and is obtained from a polymerisable mixture, characterised in that the polymerisable mixture comprises compounds containing epoxy groups, of which at least 10% by weight, preferably at least 50% by weight, particularly preferably at least 80% by weight, are siloxanes containing epoxy groups.

The invention furthermore relates to a process for the production of an optical fibre of the described type which is characterised in that the polymerisable mixture is introduced into the tubular plastic cladding and polymerised therein.

DETAILED DESCRIPTION OF THE INVENTION

Figure 1:
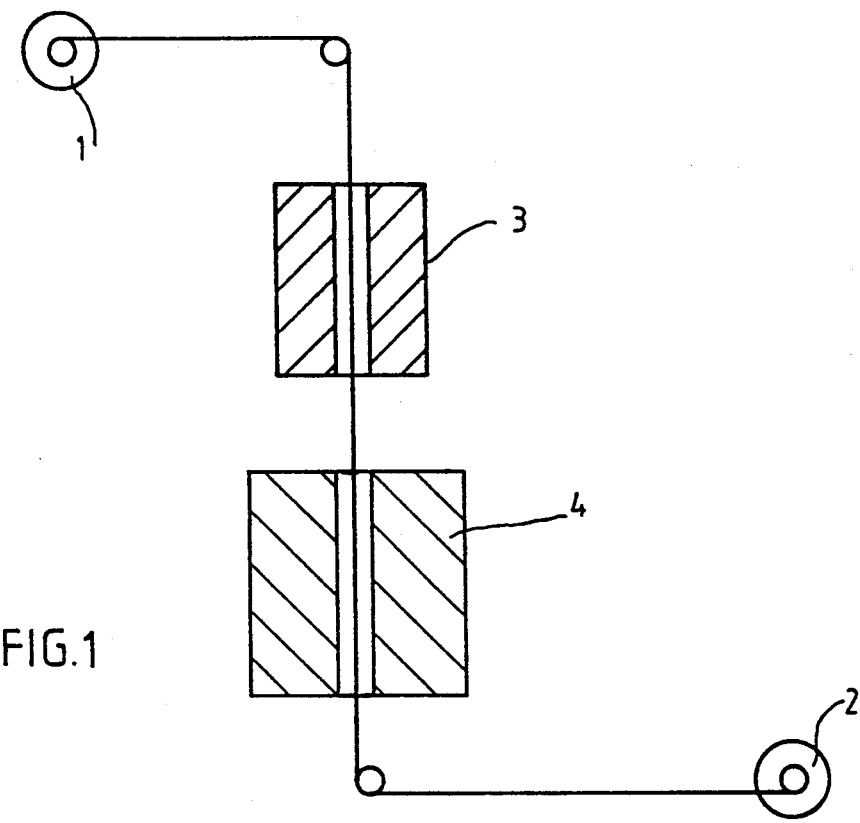
FIG. 1 and FIG. 2 show illustrative arrangements of the apparatus for the production of the optical fibres according to the invention.

Siloxanes containing epoxy groups for the optical fibres according to the invention have 2 to 20 Si atoms and can be prepared by reacting siloxane hydrides with olefinically unsaturated compounds which contain epoxy groups. These siloxane hydrides contain one or more structural units from the list below:

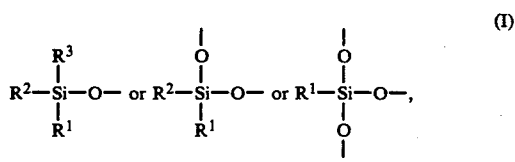

in which $R^1$, $R^2$ and $R^3$, independently of one another denote hydrogen, $C_1$–$C_5$-alkyl or phenyl, with the proviso that at least one of the radicals $R^1$, $R^2$ and $R^3$ on one Si atom represents hydrogen.

$C_1$–$C_5$-alkyl is, for example, methyl, ethyl, propyl, isopropyl, butyl, isobutyl or pentyl, preferably methyl or ethyl. Phenyl may also be substituted phenyl; suitable substituents are $C_1$–$C_4$-alkyl and/or $C_1$–$C_4$-alkoxy, for example methoxy, ethoxy, propoxy, isopropoxy, butoxy or isobutoxy.

The reaction of a siloxane hydride of this type to give a siloxane containing epoxy groups may be represented by the equation below:

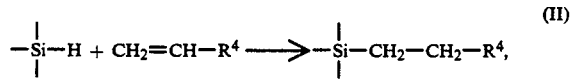
(II)

in which
$CH_2=CH-R^4$ represents a vinyl- or allyl-functionalised epoxy compound.

Examples of vinyl- or allyl-functionalised epoxy compounds of this type are allyl glycidyl ether, glycidyl acrylate, vinyl-norbornene monoxide, dicyclopentadiene oxide, 4-vinylcyclohexene oxide and others. In these compounds, $R^4$ denotes $(-CH_2)_n-X$—glycidyl where n=zero or one, and $X=-O-$ or $-COO-$, or denotes an epoxidised vinylnorbornene, dicyclopentadiene or vinylcyclohexene. Vinyl- or allyl-functionalised epoxy compounds of the said type may be represented in formulae in illustrative manner as follows:

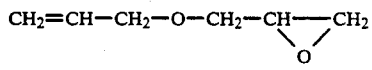

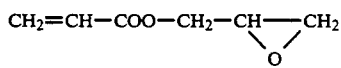

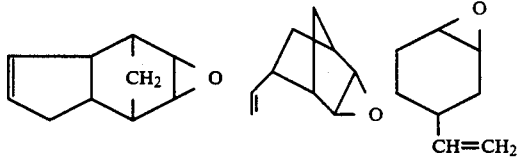

For the production of the optical fibres according to the invention, the siloxanes containing epoxy groups should have 2 to 40% by weight of epoxy groups, preferably 3 to 25% by weight of epoxy groups, based on the total weight of siloxanes containing epoxy groups.

The siloxanes containing epoxy groups which can be employed according to the invention are known (U.S. Pat. No. 4,576,999; U.S. Pat. No. 4,279,717). The polymerisable mixture which is necessary for the production of the optical fibre according to the invention may comprise 100% by weight of such siloxanes containing epoxy groups. However, according to the invention, the polymerisable mixture comprises at least 10% by weight, preferably at least 50% by weight and particularly preferably at least 80% by weight of such polysiloxanes containing epoxy groups.

In addition to these siloxanes containing epoxy groups, other compounds containing epoxy groups may be present in the polymerisable mixture. Suitable compounds of this type contain, for example, cyclohexene oxide groups, such as epoxy-cyclohexane carboxylates, for example 3,4-epoxycyclohexylmethyl-3,4-epoxycyclohexane carboxylate, 3,4-epoxy-2-methylcyclohexyl-methyl-3,4-epoxy-2-methylcyclohexane carboxylate or bis-(3,4-epoxy-6-methylcyclohexylmethyl) adipate. Such compounds containing epoxide groups are described in U.S. Pat. No. 3,117,099.

Further compounds containing epoxy groups which are suitable according to the invention are monomeric glycidyl ethers of the general formula

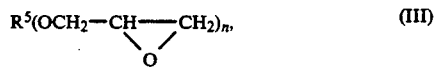
(III)

in which
$R^5$ denotes an n-valent radical of an aliphatic hydrocarbon having 1–15 carbon atoms or of a hydrocarbon having 6–36 carbon atoms containing an aromatic group, and n denotes an integer from 1 to 6.

Examples of aliphatic hydrocarbons having 1–15 carbon atoms are methane, ethane, propane, butane, isobutane, the isomeric pentanes, hexanes, octanes, decanes, dodecanes and pentadecanes.

Examples of hydrocarbons having 6–36 carbon atoms and containing an aromatic group are those of the formula

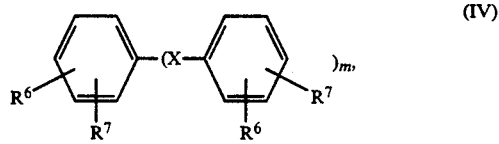
(IV)

in which
m represents zero, one or two, preferably zero or one,
X represents $C_1$–$C_6$-alkylidene or $C_3$–$C_{10}$-cycloalkylidene, but also represents the heteroatom-containing groups $-O-$, $-S-$, $-SO_2-$ or $-CO-$, and $R^6$ and $R^7$, independently of one another, represent chlorine, bromine, methyl or ethyl.

$C_1$–$C_6$-alkylidene is, for example, methylene, ethylidene, 1,1- or 2,2-propylidene and homologous butylidene, pentylidene or hexylidene.

$C_3$–$C_{10}$-cycloalkylidene is, for example, cyclopropylidene, cyclobutylidene, cyclopentylidene, cyclohexylidene, cycloheptylidene, cyclooctylidene and the derivatives thereof which are monosubstituted or polysubstituted by methyl or ethyl, such as 3,5,5-trimethyl-1,1-cyclohexyl-2-ylidene (isophoronylidene).

Examples of epoxides of this type which can likewise be employed according to the invention are described in U.S. Pat. No. 3,018,262 and in "Handbook of Epoxy Resins", Lee and Neville, McGraw-Hill Book Co., New York (1967) and include glycidyl ethers of polyhydric phenols, which are obtained by reacting a polyhydric phenol with an excess of a chlorohydrin, such as epichlorohydrin. An important example of these is the diglycidyl ether of 2,2-bis-(2,3-epoxypropoxy-phenol)-propane.

Further compounds containing epoxide groups which can be employed in the mixtures according to the invention are, for example, octadecylene oxide, epichlorohydrin, styrene oxide, glycid, bis-(2,3-epoxycyclopentyl) ether, dipentene dioxide and vinylcyclohexene oxide.

Furthermore, these compounds containing epoxy groups may in part be replaced by compounds which contain hydroxyl groups and can be copolymerised with the epoxide. The hydroxyl functionality is at least 1, preferably at least 2, and can reach up to 10. Such organic compounds containing hydroxyl groups may be liquid or solid. Examples of these are: alkanols, alkyl ethers of polyoxyalkylene glycols, alkylene glycols and polyhydroxyl compounds. Specific examples are: 1,2-ethanediol, 1,2- and 1,3-propanediol, diethylene glycol, triethylene glycol, 1,2-, 1,3-, 2,3- and 1,4-butanediol, 2-ethyl-1,6-hexanediol, bis-(hydroxymethyl)-cyclohexane, 1,18-dihydroxyoctadecane, 3-chloro-1,2-propanediol, glycerol, trimethylolpropane, pentaerythritol, sorbitol, polyoxypropylene glycols or polyoxyethylene glycols or polyoxytetramethylene glycols having molecular weights of 200 to about 10000.

The amount of compounds containing hydroxyl groups in the mixtures according to the invention depends on several factors, for example the compatibility of these compounds with the epoxides or the equivalent weight and functionality of the compounds containing hydroxyl groups or the physical properties desired of the mixture cured at the end or the photocuring rate desired.

Initiators which are able to polymerise epoxides are employed for the polymerisation of the polymerisable mixture. Examples of suitable initiators are those which, under UV irradiation, liberate a Lewis acid which is able to initiate the polymerisation of the epoxy groups. Photoinitiators of this type are known and can be prepared in a known manner (J. Am. Chem. Soc. 91 (1969), 145; J. Org. Chem. 35 (1970), 2532; U.S. Pat. No. 2,807,648; Bull. Soc. Chim. Belg. 73 (1964), 546; J. Am. Chem. Soc. 51 (1929), 2587).

Photocatalysts which can be employed according to the invention belong to the class of the onium salts and can be divided into three groups, namely halonium photoinitiators, onium photocatalysts containing elements from group VIa of the Periodic Table of the Elements, for example sulphonium photoinitiators, and finally phosphonium photoinitiators. Onium salts of the said type are known as photoinitiators, for example from U.S. Pat. No. 4,026,707, U.S. Pat. No. 3,981,897 and U.S. Pat. No. 4,069,055. Typical and frequently employed representatives are, for example:

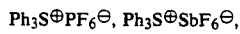

$Ph_3S^{\oplus}PF_6^{\ominus}$, $Ph_3S^{\oplus}SbF_6^{\ominus}$,

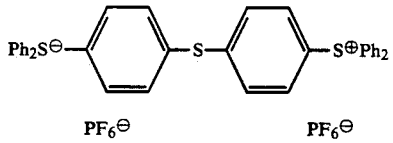

In order to increase the effectiveness of said photoinitiators, it is possible to employ sensitisers, which are known from Kirk-Othmer, Encyclopedia, Vol. 2, p. 194-197, 2nd Edition, John Wiley & Sons (1965). Typical examples of these are: 4,4'-(bis-dimethylamino)benzophenone, benzoflavine, thioxanthone, aminoxanthenes and acridine yellow.

The starting materials, namely the siloxanes containing epoxy groups and the comonomers containing epoxy groups or comonomers containing hydroxyl groups which may also be used, and the photoinitiators and, if used, the sensitisers, are first prepared in highly pure form by conventional methods, such as distillation, ultrafiltration or crystallisation, as is suitable for the use according to the invention for optical purposes. These starting materials are then mixed with one another until a homogeneous mixture has been formed. This finished mixture is referred below as the "polymerisable mixture". The photoinitiators are usually employed in amounts of 0.01 to 15%, preferably 0.05 to 3%, and the sensitisers in amounts of 0.001 to 1.5%, preferably from 0.01 to 0.5%, all based on the total weight of the polymerisable mixture.

In order to produce the optical fibres according to the invention, the polymerisable mixture can be introduced into a tubular plastic cladding and polymerised therein (process A). A variant of the production process is to shape the polymerisable mixture to give a filament, which is subsequently provided with a plastic cladding (process B).

Finally, the polymerisation and the covering with a plastic cladding can also be carried out simultaneously, for example by coextrusion (process C).

The cladding material used can be any known material. However, it is necessary that the cladding material has a refractive index at least 1% lower than that of the core material. Examples of polymers which can be used as cladding materials are described, inter alia, in GB 1,037,498. Illustrative cladding materials are: polytetrafluoroethylene, polyacrylate, polyfluoroacrylates, polyethylene and poly-4-methyl-1-pentene.

The processes outlined, in particular process A, can be carried out particularly easily if the polymerisable mixture exhibits no shrinkage during the polymerisation. The question of whether and, if so, to what extent shrinkage takes place cannot be reliably predicted and requires preliminary experiments. However, a person skilled in the art knows that he must expect shrinkage in the majority of cases. This shrinkage results in the cladding material (plastic tube) no longer being in direct contact with the polymer core, i.e. no longer closely surrounding the core. In this case, cracks can form in the polymer core, the polymer fibre forming the core being partially deformed, i.e. having an irregular cross section. It is clear that an optical fibre of this type modified by shrinkage can no longer satisfy the highest optical demands.

In the abovementioned German Patent Specification 36 25 180, it is proposed, in order to avoid the damaging effects of the shrinkage process, that one end of the cladding material (plastic tube) be dipped into the monomer mixture to be polymerised, so that, in this way, the monomer mixture can flow to follow the shrinkage. This subsequent flow is preferably achieved by keeping under pressure the storage tank into which the end of the cladding material dips.

However, both topping up under pressure and topping up without using pressure are so difficult that the quality of the optical fibres obtained by this process is low. Thus, working without pressure, in particular with relatively high-viscosity monomer mixtures, results in cracking and/or deformation of the cladding and thus unavoidably also in deformation of the polymer core as a consequence of the reduced pressure caused by the shrinkage in volume as a consequence of the polymerisation. Furthermore, formation of microcavities within the polymer core cannot be avoided. Working under pressure requires considerable technical complexity, since the pressure must be kept constant in order to avoid stress differences in the polymer fibres being produced. This pressure maintenance can only be achieved by precisely matching the pressure to the particular shrinkage in volume in a complex manner.

In an advantageous variant of the optical fibres according to the invention, their optical quality can be achieved in a significantly simpler manner than hitherto if the cladding material used, in which the polymerisable mixture forming the polymer core is polymerised, is a shrink tube (process D).

The invention therefore preferably relates to optical fibres having a shrink tube as the plastic cladding, the shrink temperature being in the range from 80° to 350° C. and the degree of shrinkage being from 1:1.2 to 5. Furthermore, shrink tubes for such optical fibres according to the invention have an internal surface with a roughness of <1200 μm.

If such shrink tubes are used for the optical fibres according to the invention, the use of complex equipment for establishing certain pressures is not necessary, although the polymerisable mixtures frequently exhibit a shrinkage in volume. The optical fibre obtainable by this method is free from cracks and has a uniform diameter over the entire length. Such optical fibres consequently have high optical quality.

The shrink temperature of the shrink tubes is preferably in the range from 100° to 220° C. The degree of shrinkage is preferably from 1:2 to 4. The internal surface preferably has a roughness of <200 μm. It is also a requirement for the shrink tube that its refractive index is at least 1% lower than that of the polymer core.

Shrink tubes for the optical fibres according to the invention are known and are commercially available products. The shrink tubes used for the optical fibres according to the invention are preferably polymers or copolymers of the following monomers: vinyl fluoride, vinylidene fluoride, tetrafluoroethylene, hexafluoropropylene, perfluoroalkyl vinyl ethers, chlorofluoroethylene, ethylene, propylene, 4-methyl-1-pentene, vinyl chloride and vinylidene chloride.

Tubular plastic claddings, in particular shrink tubes, for the optical fibres according to the invention have an internal diameter of 0.1 to 50 mm, preferably 0.5 to 15 mm, particularly preferably 1 to 2 mm.

Since the shrink tube of the optical fibre also serves for limiting the reflected light which propagates through the polymer core, there is no limitation to the wall thickness of the tubular plastic cladding, in particular the shrink tube after shrinkage, if the wall thickness is at least a multiple of the wavelength of the light to be transmitted. After shrinkage, the wall thickness of the shrink tubes employed is frequently 50 μ to 2 mm, preferably 50 to 500 μ.

The preferred optical fibres are produced by filling the shrink tube with the polymerisable mixture, initiating the polymerisation by irradiation and, if necessary, completing the polymerisation by subsequent conditioning, and subsequently, or even during the polymerisation, shrinking the shrink tube.

The shrink tube filled with the polymerisable mixture is preferably passed continuously one or more times through a heating device which covers only a short zone of the shrink tube, so that in this manner the polymerisation and shrinkage can be carried out zonewise. In this case, the polymerisation can be initiated photochemically at a temperature which results in shrinkage of the shrink tube. However, the polymerisation can also be initiated photochemically at a lower temperature than the shrink temperature, with the shrinkage being carried out subsequently. The amount of heat required for the shrinkage can be supplied by an external heat source, such as an annular oven, but may also be achieved in a combined manner by means of an external heat source and the heat of polymerisation.

A further advantageous embodiment of the production of the optical fibres according to the invention comprises merely inducing the polymerisation of the polymerisable mixture in the tubular cladding photochemically, at first carrying out no conditioning for continuing and completing the polymerisation. Such polymerisable mixtures which have only been initiated have a pot time at room temperature of from a few minutes to a few hours. The polymerisable mixtures in the tubular cladding can first be shaped as desired after induction, including shapes in which the filled tube must be bent at a radii of <1 cm. After this shaping, the polymerisation can be completed in the manner described. The advantages of the optical fibres according to the invention become clear if optical fibres according to said German Patent Specification 36 25 180 are compared, which refract even if bent at radii of <5 cm.

In order to fill the tubular cladding, preferably the shrink tube, the cladding is dipped, for example, with one end into the polymerisable monomer mixture. A suitable vacuum is then applied to the other end, and the polymerisable mixture is sucked into the tube. According to another procedure, the polymerisable mixture can also be forced into the tubular cladding, preferably into the shrink tube, by a pump. To this end, a nozzle of suitable diameter is employed. Such filling techniques are known to a person skilled in the art. When the tubular cladding has been filled, one end or both ends of the cladding or sealed. The filled tubular cladding is then subjected to the polymerisation conditions and, in the case of the shrink tube, to the shrink conditions.

Figure 2:
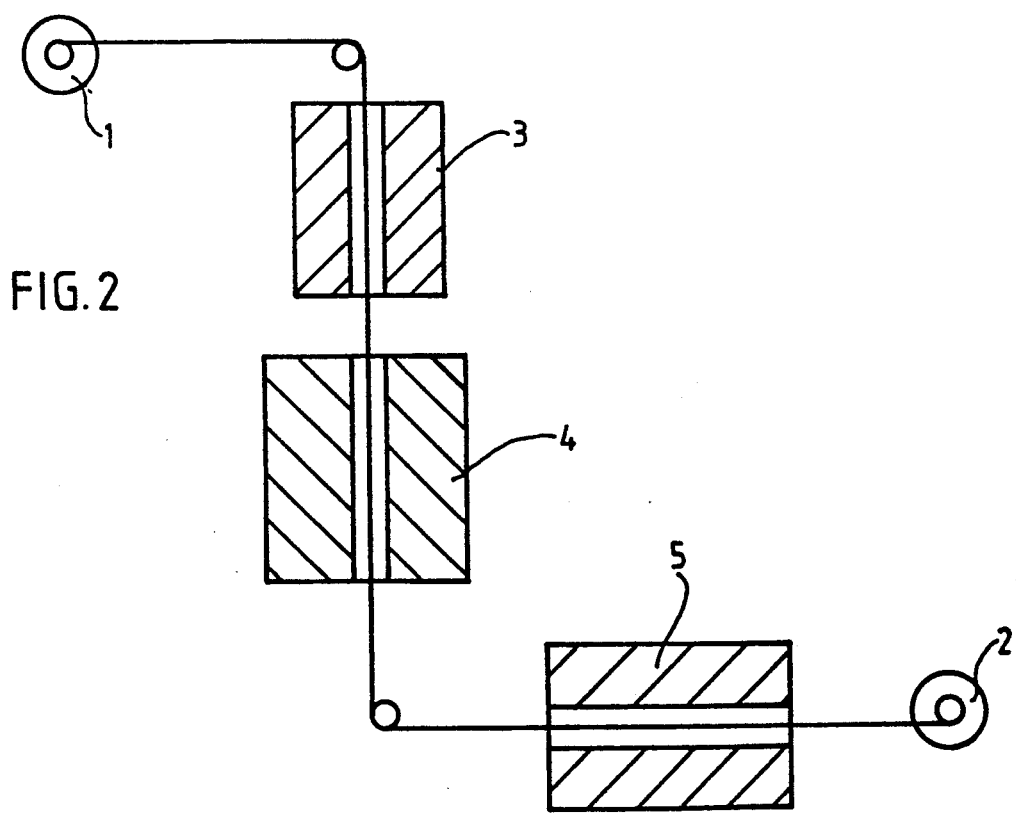

The attached FIGS. 1 and 2 show illustrative arrangements of the apparatus for the production of the optical fibres according to the invention. Thus, according to FIG. 1, a tubular cladding, preferably a shrink tube, filled with the polymerisable mixture is run from a storage roll 1 through an exposure unit 3. After passing through this exposure unit, in which the photoinduced polymerisation takes place or is initiated, the tube passes through an oven 4 heated to the desired shrink temperature. After the oven 4, the optical fibre is fed to the take-up roll 2. The exposure unit is designed to emit high-energy irradiation, for example UV irradiation. According to FIG. 2, in which the same numbers represent the apparatus parts described above, the polymerised optical fibre shrunk in the cladding is additionally drawn through an oven 5 in which thermal aftertreatment (conditioning) is carried out. The ovens 4 and 5 and the exposure unit 3 are preferably in the form of annular ovens or annular exposure units, respectively. The thermal aftertreatment serves, in particular, to eliminate stresses in the polymer core; it may also be carried out, if desired, in a separate oven after the optical fibre has been fully rolled up on the take-up roll 2.

The speed at which the shrink tubes filled with the polymerisable mixture or with a pre-polymerised material are passed through the ovens or through the exposure unit depends on the reactivity of the polymerisable mixture, on the reactivity of the photoinitiator, on the effect of any sensitiser used, on the temperature and energy of the irradiation used and on the type of shrinkable material. These and other influencing variables and their effect are known to a person skilled in the art.

Their magnitude can be determined by simple preliminary experiments.

In the case of polymerisable mixtures which are not or not very shrinkable, the above-described process can also be carried out using non-shrinkable cladding materials in accordance with process A.

EXAMPLES 1 TO 10 AND COMPARATIVE EXAMPLES 1 AND 2

General

Shrink tube material:

The cladding material used was a shrink tube comprising a fluorinated ethylene-propylene copolymer (FEP) (commercial product from Messrs Isofluor): shrink ratio 1.3:1; internal diameter 2.34 mm; wall thickness after shrinkage −0.23 mm; refractive index 1.33 at 20° C., roughness of the internal surface <200 μm.

The compounds containing epoxy groups were filtered under clean-room conditions through a polyamide filter from Messrs Sartorius (pore size 0.2 μm) or through a Durapore filter from Messrs Millipore (pore size 0.2 μm). The distillable compounds containing epoxy groups were distilled in a high vacuum before filtration.

Filling of the shrink tube:

The polymerisable monomer mixtures were forced into the shrink tube by means of a piston/cylinder apparatus.

Polymerisation:

The polymerisation was induced at room temperature by means of UV irradiation/chemically. The irradiation source 3 (FIGS. 1 and 2) was 10 type TL 8W/08; F8T5 BLB fluorescent tubes from Messrs Philips. The distance of the fluorescent tubes from the shrink tube was 4 cm. The annular oven 4 (FIGS. 1 and 2) was heated to 150° C.

Attenuation measurements:

The attenuation was measured by the CUT-OFF method: light was introduced into an optical fibre with the aid of an HeNe laser and a focusing optical system, and the transmitted intensity was measured at the end of the initially unshortened optical fibre. Further measurements were, carried out after a number of defined shortenings in length.

From these data, the attenuation was calculated in accordance with the formula $$Attenuation[dB] = 10\ log_{10}\ (I_{short}/I_{long}).$$

These attenuation values, plotted against the length, are on a straight line whose slope gives the specific attenuation.

The photocatalysts used were commercially available ones, namely Cyracure UVI 6974 (P 1):

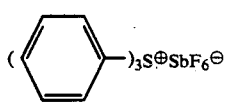

Cyracure UVI 6990 (P 2):

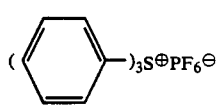

from Union Carbide Corporation and Degacure KI 85 (P 3)

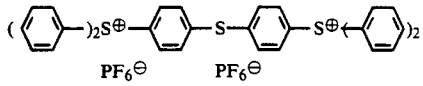

from Degussa AG.

The siloxanes containing epoxy groups were those below of the formulae

S 1: $M_2D^*_{10}$
S 2: $M_2D_4$
S 3: $D_{15}M^*_2$, where $M = (CH_3)_3Si-O_{0.5}$ (1 oxygen atom for 2 end groups)

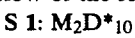

(1 oxygen atom for 2 end groups)

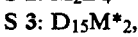

The following are examples of detailed formulae: $M_2D^*_{10}$:

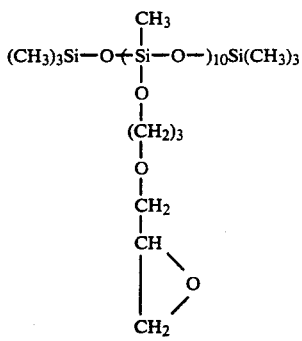

$D_{15}M^*_2$:

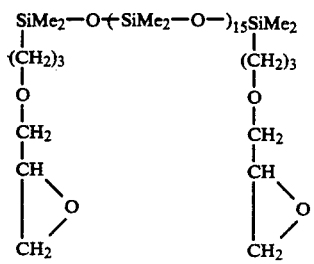

The comonomers containing epoxy groups were the following:

C1: Degacure K126 from Degussa AG

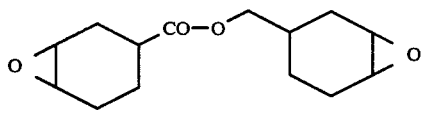

and

C2: Cyracure UVR 6200 from Union Carbide (cycloaliphatic epoxide).

The following polymerisable mixtures were prepared (data in % by weight):

| Example | S1 | S2 | S3 | C1 | C2 | P1 | P2 | P3 |
|---------|------|------|------|------|------|------|------|------|
| 1 | 99.9 | | | | | 0.1 | | |
| 2 | 69.9 | | | 30 | | 0.1 | | |
| 3 | 99.9 | | | | | | 0.1 | |
| 4 | 50.0 | | | 49.9 | | | 0.1 | |
| 5 | 59.9 | | | 30 | 10 | 0.1 | | |
| 6 | | 99.9 | | | | | | 0.1 |
| 7 | | | 99.9 | | | 0.1 | | |
| 8 | | 69.9 | | 30 | | | 0.1 | |
| 9 | | | 69.9 | | 30 | 0.1 | | |
| 10 | 50 | 24.9 | | 25 | | 0.1 | | |

Comparative Example 1 is a polycarbonate optical fibre Optipol ® fibre 100 from Bayer AG.

Comparative Example 2 is a polymethyl methacrylate (PMMA) optical fibre type Eska Extra from Mitsubishi Rayon.

The following values were obtained:

| Example | Attenuation (dB/km) | Attenuation after conditioning for 5 hours at 150° C. (dB/km) |
|---------|---------|---------|
| 1 | 800 | 1100 |
| 2 | 860 | 1250 |
| 3 | 820 | 1100 |
| 4 | 1050 | 1310 |
| 5 | 1460 | 1510 |
| 6 | 1700 | 1750 |
| 7 | 2500 | 2850 |
| 8 | 3100 | 3600 |
| 9 | 1760 | 2010 |
| 10 | 2850 | 3000 |
| Comp. 1 | 1900 | >100,000 |
| Comp. 2 | 200 | >100,000 |

What is claimed is:

1. An optical fibre having a tubular plastic cladding and a core of a polymer whose refractive index is at least 1% greater than that of the cladding material wherein the core polymer and which is obtained from a polymerisable mixture that comprises compounds containing epoxy groups, of which at least 10% by weight of siloxanes containing epoxy groups.

2. The optical fibre of claim 1, wherein the polymerisable compounds containing epoxy groups are at least 50% by weight siloxanes containing epoxy groups.

3. The optical fibre of claim 2, wherein the polymerisable compounds containing epoxy groups are at least 80% by weight siloxanes containing epoxy groups.

4. A process for the production of the optical fibre of claim 1, wherein the polymerisable mixture is introduced into the tubular plastic cladding and polymerised therein.

5. The optical fibre of claim 1, wherein the compounds containing epoxy groups have been replaced in part by compounds which contain hydroxyl groups and are copolymerisable with the epoxide.

6. The optical fibre of claim 1, wherein the tubular plastic cladding has an internal diameter of 0.1 to 50 mm and has a wall thickness which is at least a multiple of the wavelength of the light to be transmitted.

7. The optical fibre of claim 1, wherein the tubular plastic cladding used is a shrink tube whose shrink temperature is in the range from 80° to 350° C., whose degree of shrinkage is from 1:1.2 to 5 and whose internal surface has a roughness of <1200 μm.

8. The optical fibre of claim 7, wherein the shrink temperature is in the range from 100° to 220° C.

9. The optical fibre of claim 7, wherein the degree of shrinkage is from 1:2 to 4.

10. The optical fibre of claim 7, wherein the roughness is <200 μm.

11. The optical fibre of claim 1, wherein the polymerisation of the polymerisation mixture is merely induced photochemically, the optical fibre is then shaped as desired, and the polymerisation is then completed.

12. The optical fibre of claim 1, wherein the siloxanes containing epoxy groups have 2 to 20 Si atoms.

13. The optical fibre of claim 1, wherein the siloxanes containing epoxy groups are prepared by reacting siloxane hydrides with olefinically unsaturated compounds containing epoxy groups, the siloxane hydrides containing one or more structural units of the formulae

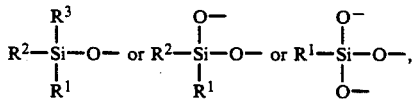

in which

R$^1$, R$^2$ and R$^3$, independently of one another, denote hydrogen, C$_1$–C$_5$-alkyl or phenyl, with the proviso that at least one of the radicals R$^1$, R$^2$ and R$^3$ on one Si atom represents hydrogen.

14. The optical fibre of claim 1, wherein the siloxanes containing epoxides have 2–40% by weight of epoxy groups, based on the total weight of the epoxy groups containing siloxanes.

15. The optical fibre of claim 14, wherein the siloxanes have 3–25% by weight of epoxy groups.

* * * * *

UNITED STATES PATENT AND TRADEMARK OFFICE
CERTIFICATE OF CORRECTION

PATENT NO. : 5,204,930
DATED : April 20, 1993
INVENTOR(S) : Brandt et al.

It is certified that error appears in the above-identified patent and that said Letters Patent is hereby corrected as shown below:

Col. 11, line 56    Delete " and which "

Col. 12, line 31    Delete " polymerisation " (second occurrence) and substitute -- polymerisable --

Signed and Sealed this

Sixteenth Day of August, 1994

Attest:

BRUCE LEHMAN

*Attesting Officer*    *Commissioner of Patents and Trademarks*